(12) United States Patent
Majid

(10) Patent No.: US 10,833,728 B2
(45) Date of Patent: Nov. 10, 2020

(54) USE OF CROSSTALK BETWEEN ADJACENT CABLES FOR WIRELESS COMMUNICATION

(71) Applicant: Javid Akhtar Majid, Houston, TX (US)

(72) Inventor: Javid Akhtar Majid, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 16/049,134

(22) Filed: Jul. 30, 2018

(65) Prior Publication Data
US 2019/0044574 A1 Feb. 7, 2019

Related U.S. Application Data

(60) Provisional application No. 62/539,773, filed on Aug. 1, 2017.

(51) Int. Cl.
*H04B 3/52* (2006.01)
*E21B 47/12* (2012.01)

(52) U.S. Cl.
CPC .............. *H04B 3/52* (2013.01); *E21B 47/12* (2013.01)

(58) Field of Classification Search
None
See application file for complete search history.

(56) References Cited

U.S. PATENT DOCUMENTS

| | | | |
|---|---|---|---|
| 2,651,370 | A | 9/1953 | Pearson |
| 5,140,318 | A * | 8/1992 | Stiner ............... E21B 47/135 340/854.8 |
| 5,370,545 | A | 12/1994 | Laurent |
| 5,597,042 | A | 1/1997 | Tubel et al. |
| 6,216,784 | B1 | 4/2001 | Harrell et al. |
| 6,343,649 | B1 | 2/2002 | Beck et al. |
| 6,450,263 | B1 | 9/2002 | Schwendemann |
| 6,481,505 | B2 | 11/2002 | Beck et al. |

(Continued)

FOREIGN PATENT DOCUMENTS

EP 2196621 A1 6/2010
WO 2016110826 A1 7/2016

OTHER PUBLICATIONS

Adeyemi, et al.; "Optimizing Well Test Sequence and Duration Using Real-Time Pressure Transient Analysis (RT-PTA)"; IPTC 10747; 2005; International Petroleum Technology Conference; 7 pages.

(Continued)

*Primary Examiner* — Curtis A Kuntz
*Assistant Examiner* — Jerold B Murphy
(74) *Attorney, Agent, or Firm* — Cantor Colburn LLP

(57) ABSTRACT

A system for communicating a signal between a tool and a signal processing unit includes a signal processing unit configured to at least one of transmit and receive the signal and a first cable coupled to the signal processing unit. The system further includes a tool having a second cable extending from the tool and configured to at least one of receive the signal transmitted by the signal processing unit and transmit the signal received by the signal processing unit, wherein signal is communicated between the first cable and the second cable by crosstalk.

19 Claims, 2 Drawing Sheets

(56) References Cited

U.S. PATENT DOCUMENTS

| | | | |
|---|---|---|---|
| 6,712,141 B1 | 3/2004 | Bussear et al. | |
| 7,777,644 B2 | 8/2010 | Madhavan et al. | |
| 8,602,658 B2 | 12/2013 | Hopmann et al. | |
| 2003/0218939 A1* | 11/2003 | Casarsa | G01V 1/52 367/35 |
| 2005/0087368 A1* | 4/2005 | Boyle | E21B 17/028 175/57 |
| 2005/0110655 A1 | 5/2005 | Layton | |
| 2011/0108267 A1* | 5/2011 | Chaize | E21B 17/028 166/242.6 |
| 2012/0229293 A1 | 9/2012 | Weerasinghe | |
| 2014/0266210 A1* | 9/2014 | Godager | G01V 3/34 324/323 |
| 2015/0167452 A1* | 6/2015 | Godager | H01Q 9/16 340/854.6 |
| 2015/0241596 A1* | 8/2015 | Donderici | G01V 13/00 324/338 |
| 2016/0112092 A1* | 4/2016 | Henry | H04B 3/52 455/14 |
| 2016/0246075 A9 | 8/2016 | Howell et al. | |
| 2016/0319658 A1 | 11/2016 | Chia et al. | |
| 2019/0032472 A1* | 1/2019 | Ahmadi Kalateh Ahmad | G01V 3/34 |

OTHER PUBLICATIONS

International Search Report and the Written Opinion of the International Searching Authority, or the Declaration: PCT/US2018/044364; dated Dec. 3, 2018; 12 pages.

* cited by examiner

# USE OF CROSSTALK BETWEEN ADJACENT CABLES FOR WIRELESS COMMUNICATION

CROSS REFERENCE TO RELATED APPLICATIONS

This application claims the benefit of an earlier filing date from U.S. Provisional Application Ser. No. 62/539,773 filed Aug. 1, 2017, the entire disclosure of which is incorporated herein by reference.

BACKGROUND

Boreholes are drilled into the earth to provide wells for the production of hydrocarbons. Well completions involve the assembly of tubulars and installation of the tubulars and other equipment into the wells. Typically, the other equipment may include downhole tools, instruments and sensors that communicate with a surface signal processing unit via a direct cable connection. Unfortunately, these cable connections can be unreliable due to the harsh downhole environment. Hence, it would be appreciated in the hydrocarbon production industry if apparatuses and methods were developed that could provide reliable and robust communication with the surface.

BRIEF SUMMARY

Disclosed is a system for communicating a signal between a tool and a signal processing unit. The system includes: a signal processing unit configured to at least one of transmit and receive the signal; a first cable coupled to the signal processing unit; and a tool having a second cable extending from the tool and configured to at least one of receive the signal transmitted by the signal processing unit and transmit the signal received by the signal processing unit; wherein signal is communicated between the first cable and the second cable by crosstalk.

Also disclosed is a method for communicating a signal between a tool and a signal processing unit. The method includes: at least one of (i) transmitting the signal from the signal processing unit connected to a first cable to the tool having a second cable and (ii) receiving the signal from the tool using the signal processing unit; and at least one of (iii) receiving with the tool the corresponding signal transmitted by the signal processing unit and (iv) transmitting with the tool the corresponding signal received by the signal processing unit; wherein the signal is communicated between the first cable and the second cable by crosstalk.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed are embodiments of apparatuses and methods that provide robust and reliable communication between a tool and a surface signal processing unit. A first cable having a conductor is disposed in a wellbore. One or more tools having communication capabilities are disposed at selected depths in the wellbore. Each tool is connected to a second cable separate from but close to the first cable. Due to the closeness of the cables, communication between the cables occurs due to crosstalk. Reliability and robustness in communications occurs because a connection between a tool and the corresponding second cable can be made in a controlled environment such as at an offsite location where the connection can be pressure-tested to insure its reliability and robustness.

Figure 1:
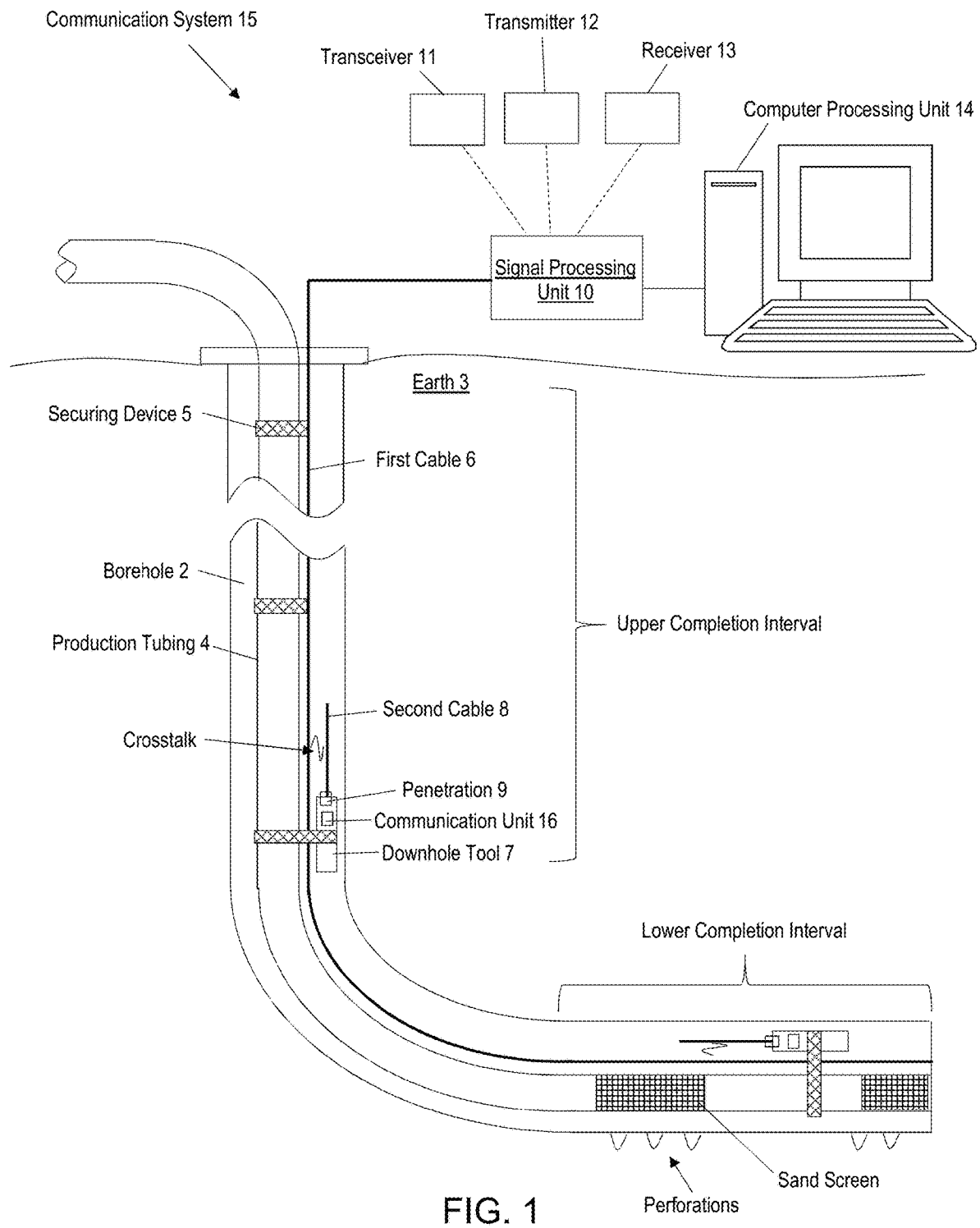
FIG. 1 is a cross-sectional view of an embodiment of a communication system.

FIG. 1 is a cross-sectional view of a communication system 15. The communication system 15 includes a first cable 6 disposed in a borehole 2 (also referred to as a wellbore) penetrating the earth 3. The first cable 6 includes at least one conductor. In one or more embodiments, the first cable 6 is a tubing encapsulated conductor (TEC), which can have one or more conductors, or a wireline cable generally used for wireline logging as known in the art. The first cable 6 is secured to a production tubular 4 by one or more securing devices 5, which can be clamps in a non-limiting embodiment. The first cable 6 extends a selected distance into the borehole 2. The first cable 6 can be (1) directly connected (i.e., hardwired) to some devices in the borehole 2 for communication purposes or (2) not directly connected to any devices in the borehole 2 as illustrated in FIG. 1, or (3) terminated with some other termination impedance.

Also disposed in the borehole 2 are one or more tools 7. The tool 7 represents any operational tool, instrument, and/or sensor that has a communication capability by using a communication unit 16 in or with the tool. Non-limiting embodiments of the sensors include temperature, pressure, acoustic, and chemical. Communication can be analog, digital, or a combination of analog and digital. Connected to each tool 7 is a second cable 8. A length of the second cable 8 can range from a few inches to several meters in non-limiting embodiments and in general is less than the length of the first cable. In one or more embodiments, the second cable 8 is connected to the tool 7 and thus the communication unit 16 via a penetration 9 that provides a fluid resistant and pressure resistant connection.

In general, the second cable 8 is disposed close to or in proximity of the first cable 6 such as within a few inches in order to have crosstalk between the two cables. The terms "close to" and "in proximity of" relate to being close enough to enable crosstalk. Crosstalk in one or more embodiments occurs due to capacitive, inductive, and/or conductive coupling between the two cables. In one or more embodiments, the second cable 8 is secured to and touches the outside insulation of the first cable 6. The outside insulation of the first cable 6 can touch the outside insulation of the second cable but may also not have to for the crosstalk to occur. To be clear, there is no direct electrical connection between the first cable 6 and the tool 7. All communication is via crosstalk between the first cable 6 and the second cable 6. It can be appreciated that in one or more embodiments, more than one tool 7 can communicate over the same first cable 6 using the same communication protocols that would be used if those tools were hardwired to the same first cable 6.

At the surface of the earth 3, the first cable 6 is connected or coupled to a signal processing unit 10 that is configured to transmit and/or receive signals to and/or from the one or more tools 7. Non-limiting embodiments of the signal processing unit include a transceiver 11, a transmitter 12, or a receiver 13. Communication protocols using crosstalk are the same as those that would be used if the tool 7 was hardwired to the first cable 6. The signal processing unit 10 may also be connected or coupled to a computer processing system 14 for processing data received from the one or more tools 7 and/or sending control signals to the one or more tools 7. Hence, the computer processing system 14 may function as a controller.

The wellbore may be divided into two intervals—an upper completion interval and a lower completion interval at which hydrocarbons are produced. In general, the lower completion interval may be identified by having sand screens and perforations in a casing to let in hydrocarbons.

Figure 2:
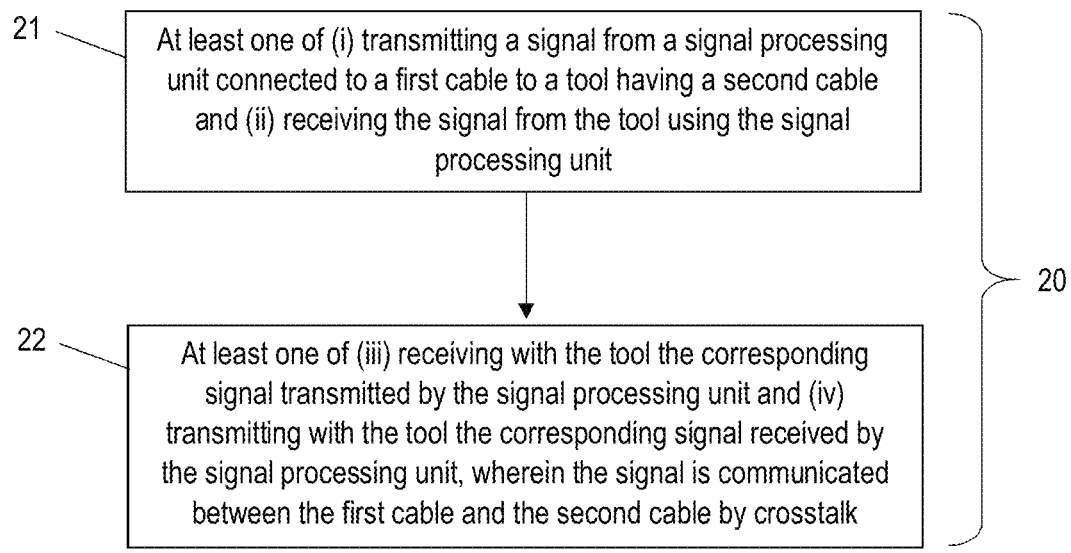
FIG. 2 is a flow chart for a method for communicating between a tool and a signal processing unit.

FIG. 2 is a flow chart for a method 20 for communicating a signal between a tool and a surface signal processing unit. Block 21 calls for at least one of (i) transmitting the signal from the signal processing unit connected to a first cable to the tool having a second cable and (ii) receiving the signal from the tool using the signal processing unit. Block 22 calls for at least one of (iii) receiving with the tool the corresponding signal transmitted by the signal processing unit and (iv) transmitting with the tool the corresponding signal received by the signal processing unit, wherein the signal is communicated between the first cable and the second cable by crosstalk.

In the method 20, the first cable and the tool may be disposed in a borehole penetrating the earth. In one or more embodiments, the tool may be disposed in a completion interval in the borehole.

The method 20 may further include processing data in the signal received from the tool using a computer processing system coupled to the signal processing unit.

The method 20 may further include providing a control input to the signal processing unit for transmission to the tool using a controller.

The method 20 may further include pressure-testing a connection between the second cable and the tool before the tool is disposed in the borehole.

The method 20 provides several advantages. One advantage is that the connection between the second cable and the first cable can be made up in a controlled environment such as an environment that is offsite. The controlled environment can meet cleanliness standards and allow for precision connections that can provide reliable and robust connections. Further, the connections can be pressure-tested to ensure that there is no leakage. In contrast, conventional communication methods require making splices at the rig or field-site to directly connect (i.e., hardwire) a tool to a first cable. Because these conventional connections may be made at the rig or filed-site, they may be made in a less than desirable environment without being pressure-tested. This can lead to leakage and unreliable connections, which can result in unreliable communications.

It can be appreciated that the connection is not limited to conventional pressure seal connections made at the rig or field-site as makeup of this connection is being performed in a non-hazardous area. Thus, the connection may be made and then a pressure seal achieved via welding or other gas/pressure sealing method.

Another advantage is that there is no rush to make connections offsite in a controlled environment. In contrast, because completion time can be very expensive, workers can be rushed to make these connections and may not make them correctly.

Yet another advantage is that with the method 20 more reliable communication can be had with downhole tools in the completion zone where hydrocarbons are entering the wellbore and thus may damage splices.

Set forth below are some embodiments of the foregoing disclosure:

Embodiment 1

A system for communicating a signal between a tool and a signal processing unit, the system comprising: a signal processing unit configured to at least one of transmit and receive the signal; a first cable coupled to the signal processing unit; and a tool comprising a second cable extending from the tool and configured to at least one of receive the signal transmitted by the signal processing unit and transmit the signal received by the signal processing unit; wherein signal is communicated between the first cable and the second cable by crosstalk.

Embodiment 2

The system according to any prior embodiment, wherein the first cable is not hardwired to another device.

Embodiment 3

The system according to any prior embodiment, wherein the first cable is hardwired to at least one of another tool and an impedance termination.

Embodiment 4

The system according to any prior embodiment, wherein the first cable is disposed in a borehole penetrating the earth.

Embodiment 5

The system according to any prior embodiment, wherein the first cable is secured to a production tubular disposed in the borehole using at least one securing device.

Embodiment 6

The system according to any prior embodiment, wherein the first cable is a tubing encapsulated conductor (TEC) or a wireline cable configured for wireline logging.

Embodiment 7

The system according to any prior embodiment, wherein the signal processing unit is disposed at a surface of the earth.

Embodiment 8

The system according to any prior embodiment, wherein the tool is disposed in the borehole.

Embodiment 9

The system according to any prior embodiment, wherein the tool is disposed in a lower completion interval.

Embodiment 10

The system according to any prior embodiment, wherein the signal processing unit is at least one of a transmitter, a receiver, and a transceiver.

Embodiment 11

The system according to any prior embodiment, further comprising a computer processing system coupled to the signal processing unit and configured to at least one of process data from a received signal and provide a control input to be transmitted in a transmitted signal.

Embodiment 12

The system according to any prior embodiment, wherein the tool comprises at least one of a tool configured to perform an operation, an instrument, and a sensor.

Embodiment 13

The system according to any prior embodiment, wherein a length of the second cable is less than the length of the first cable.

Embodiment 14

The system according to any prior embodiment, wherein the tool comprises a penetration through which the tool cable enters the tool, the penetration being configured to resist fluid entry and pressure.

Embodiment 15

The system according to any prior embodiment, wherein the tool comprises a communication unit coupled to the tool cable and configured to at least one of transmit and receive the signal.

Embodiment 16

The system according to any prior embodiment, wherein a connection between the second cable and the tool is pressure sealed by a welded connection.

Embodiment 17

A method for communicating a signal between a tool and a signal processing unit, the method comprising: at least one of (i) transmitting the signal from the signal processing unit connected to a first cable to the tool having a second cable and (ii) receiving the signal from the tool using the signal processing unit; and at least one of (iii) receiving with the tool the corresponding signal transmitted by the signal processing unit and (iv) transmitting with the tool the corresponding signal received by the signal processing unit; wherein the signal is communicated between the first cable and the second cable by crosstalk.

Embodiment 18

The method according to any prior embodiment, further comprising processing data in the signal received from the tool using a computer processing system coupled to the signal processing unit.

Embodiment 19

The method according to any prior embodiment, further comprising providing a control input to the signal processing unit for transmission to the tool using a controller.

Embodiment 20

The method according to any prior embodiment, further comprising pressure-testing a connection between the second cable and the tool before the tool is disposed in the borehole.

Embodiment 21

The method according to any prior embodiment, wherein the first cable is disposed in a borehole penetrating the earth and the method further comprising disposing the tool in a completion zone in a borehole.

In support of the teachings herein, various analysis components may be used, including a digital and/or an analog system. For example, the one or more tools 7, the computer processing system 14, and/or the communication unit 16, may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured. The terms "first" and "second" are used to differentiate elements and do not denote a particular order. The term "at least one of" in the context of at least one of A and B is intended to mean A and/or B or stated in other terms A, B, or A and B.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The disclosure illustratively disclosed herein may be practiced in the absence of any element which is not specifically disclosed herein.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for communicating a signal between a tool disposed in a borehole penetrating the earth and a signal processing unit, the system comprising:
    a signal processing unit configured to at least one of transmit and receive the signal;
    a first cable coupled to the signal processing unit and disposed in the borehole wherein a production tubular configured to convey hydrocarbons is further disposed in the borehole; and
    a tool disposed in the borehole adjacent to the production tubular and comprising a second cable that is not in electrical contact with the first cable and extending from the tool and configured to at least one of receive the signal transmitted by the signal processing unit and transmit the signal received by the signal processing unit;
    wherein the signal is communicated directly between the first cable and the second cable by crosstalk without an intermediate device and the signal excludes at least one of guided waves and surface waves and the signal further excludes radio waves.

2. The system according to claim 1, wherein the first cable is not hardwired to another device.

3. The system according to claim 1, wherein the first cable is hardwired to at least one of another tool and an impedance termination.

4. The system according to claim 1, wherein the tool comprises a communication unit coupled to the tool cable and configured to at least one of transmit and receive the signal.

5. The system according to claim 1, wherein the first cable is secured externally to the production tubular disposed in the borehole using at least one securing device.

6. The system according to claim 1, wherein the first cable is a tubing encapsulated conductor (TEC) or a wireline cable configured for wireline logging.

7. The system according to claim 1, wherein the signal processing unit is disposed at a surface of the earth.

8. The system according to claim 1, wherein a connection between the second cable and the tool is pressure sealed by a welded connection.

9. The system according to claim 1, wherein the tool is disposed in a lower completion interval.

10. The system according to claim 1, wherein the signal processing unit is at least one of a transmitter, a receiver, and a transceiver.

11. The system according to claim 1, further comprising a computer processing system coupled to the signal processing unit and configured to at least one of process data from a received signal and provide a control input to be transmitted in a transmitted signal.

12. The system according to claim 1, wherein the tool comprises at least one of a tool configured to perform an operation, an instrument, and a sensor.

13. The system according to claim 1, wherein a length of the second cable is less than the length of the first cable.

14. The system according to claim 1, wherein the tool comprises a penetration through which the tool cable enters the tool, the penetration being configured to resist fluid entry and pressure.

15. A method for communicating a signal between a tool disposed in a borehole penetrating the earth and a signal processing unit, the method comprising:
    at least one of (i) transmitting the signal from the signal processing unit connected to a first cable disposed in the borehole to the tool having a second cable that is not in electrical contact with the first cable and extending from the tool and (ii) receiving the signal from the tool using the signal processing unit, the tool being disposed in the borehole adjacent to a production tubular configured to convey hydrocarbons; and
    at least one of (iii) receiving with the tool the corresponding signal transmitted by the signal processing unit and (iv) transmitting with the tool the corresponding signal received by the signal processing unit;
    wherein the signal is directly communicated between the first cable and the second cable by crosstalk without an intermediate device and the signal excludes at least one of guided waves and surface waves and the signal further excludes radio waves.

16. The method according to claim 15, further comprising disposing the tool in a completion zone in a borehole.

17. The method according to claim 15, further comprising pressure-testing a connection between the second cable and the tool before the tool is disposed in the borehole.

18. The method according to claim 15, further comprising processing data in the signal received from the tool using a computer processing system coupled to the signal processing unit.

19. The method according to claim 15, further comprising providing a control input to the signal processing unit for transmission to the tool using a controller.

* * * * *